Jan. 15, 1963 R. W. GILBERT 3,074,057
PULSE-TIME ENCODING APPARATUS
Filed March 12, 1957 4 Sheets-Sheet 1

ROSWELL W. GILBERT
INVENTOR.

BY Rudolph J. Quick
ATTORNEY

Jan. 15, 1963 R. W. GILBERT 3,074,057

PULSE-TIME ENCODING APPARATUS

Filed March 12, 1957 4 Sheets-Sheet 2

ROSWELL W. GILBERT
INVENTOR.

BY Rudolph J. Jurick
ATTORNEY

Jan. 15, 1963 R. W. GILBERT 3,074,057

PULSE-TIME ENCODING APPARATUS

Filed March 12, 1957 4 Sheets-Sheet 3

ROSWELL W. GILBERT
INVENTOR.

BY Rudolph J. Juvich
ATTORNEY

ROSWELL W. GILBERT
INVENTOR.
BY Rudolph J. Juick
ATTORNEY

United States Patent Office 3,074,057
Patented Jan. 15, 1963

3,074,057
PULSE-TIME ENCODING APPARATUS

Roswell W. Gilbert, Montclair, N.J., assignor, by mesne assignments, to Daystrom, Incorporated, Murray Hill, N.J., a corporation of Texas
Filed Mar. 12, 1957, Ser. No. 645,604
11 Claims. (Cl. 340—347)

This invention relates to a telemetering system and more particularly to encoding apparatus for use in a pulse-time telemetering system wherein an analog input, of current or potential, is converted to electrical pulses which may be sent over a standard telephone circuit.

Telemetering in a broad sense includes several classifications having little in common. It will be understood that no generalized system of telemetering is possible; and any particular system is specific to one class. Examples of various classes of telemetering systems are: current-balance types which are limited to local D.-C. circuits; printer-coded types using teletype circuits; certain high-speed systems requiring wide-band circuits and which were developed principally for testing aircraft; and those designed to operate over so called standard telephone circuits.

The systems having the most general utility are those tailored to operate over standard telephone circuits. Standard circuits are leased at much less cost than special circuits capable of carrying D.-C. or wide-band traffic. Furthermore, standard circuits are available between all points served by telephone, whereas special circuits often are limited in extent or require set-up charges. The pulse-time encoder of my invention is adapted to transmit into the standard 600-ohm telephone circuit, and utilizes the maximum information band width of which the telephone circuits are capable.

The bandwidth of standard telephone circuits is approximately 1000 c.p.s. between 3 db points. In terms of information bandwidth this corresponds to a resolution-time product of 0.001 second. Thus, an analog magnitude may be transmitted with an accuracy of 1 percent in 0.1 second, or 0.1 percent in one second, or 0.01 percent in 10 seconds, etc., and noise levels not exceeding 3 db below the signal peak level.

To approach the above-described theoretical limit, the telemetering system redundancy must be reduced by designing the encoding and decoding processes of transmission and reception, in total, to have a resolution substantially better than the equivalent bandwidth of the communication medium. In contemporary systems, the accuracy and the response speed are independently limited by internal characteristics so that the product is less than that of the telephone circuit, resulting in redundant performance. In the telemetering system in which my encoder forms a part the telephone circuit rather than the encoding and decoding apparatus limits the efficiency of the system.

There are many systems of coding which may be employed in telemetering, all of which broadly involve frequency modulation. However, one desirable limitation is that no absolute time reference be required, which indicates that methods based upon time ratio are preferred to those based upon time differential. The coding mode herein used is the time ratio between successive pulses of alternate polarity. The pulses are developed, or encoded, by comparing the analog input, of voltage or current, with a standardized reference current by time switching. The entire encoding process is within a feedback loop so that the comparison is made with a resolution determined by the loop again, so the system variables are degenerated out. In fact, closed-loop operation is the primary criterion of high accuracy, as in any component assemblage including electronic elements.

Naturally, any system of precise translation must have a defined standard of operation. The pulse-time telemetering system of my invention is based upon sequential pulses that are sharp with respect to their periodic time. If the time interval between a positive pulse and the following negative pulse is $T_1$, and the following interval to the next positive pulse is $T_2$, the information is the ratio:

$$\frac{T_1}{T_1+T_2}=\frac{T_1}{T_o} \qquad (1)$$

wherein $T_o$ is the repetition period.

Conventionally, in the encoding apparatus of a telemetering system, the analog input is periodically sampled instantaneously, without knowledge of the analog level between the instantaneous sampling events. If the analog input is undergoing dynamic change, the resulting pulse-time signal is uncertain to a degree approaching the amount of the change. Systems of this type are, therefore, restricted to substantially steady-state input conditions. In contrast, the encoder of my invention functions by continuous integration of the input against time, and periodic division of the integral by time. Thereby, all components of the input, transient or steady-state, are included, and dynamic variations are acceptable.

An object of this invention is the provision of a pulse-time telemetering encoding apparatus which is particularly adapted for use with standard telephone circuits.

An object of this invention is the provision of a pulse-time encoder for pulse-time encoding an analog input and comprising a D.-C. amplifier having an input and output circuit, the said analog input being connected to the said D.-C. amplifier input circuit; a capacitor connected between the said D.-C. amplifier output and input circuits; D.-C. gating means, the output of the said D.-C. amplifier being connected thereto for control thereof, the said D.-C. gating means being gated open at a first predetermined and consistent level of amplifier output and gated closed at a second predetermined and consistent level thereof; and a source of D.-C. reference current connected to the said input circuit of the D.-C. amplifier through the said gating means and controlled thereby.

An object of this invention is the provision of an encoding apparatus for converting an analog current or potential into sequential pulses of alternate polarity, the time ratio between successive pulses being related to the magnitude of the said analog input current or potential, the said apparatus comprising a D.-C. amplifier having an input and output circuit; a capacitor connected between the said output and input circuits; a step function producing circuit; means responsive to the said D.-C. amplifier output controlling the time duration of the said step function, a D.-C. gating circuit controlled by the said step function, a source of D.-C. reference current connected to the said D.-C. amplifier input circuit through the said D.-C. gating circuit, and a pulse-forming circuit connected to the said step function producing circuit whereby the said sequential pulses are formed.

An object of this invention is the provision of a pulse-time encoding apparatus for electrically converting an analog current into sequential pulses having a time duration ratio related to the magnitude of the said analog current, the said apparatus comprising, a D.-C. amplifier having an input and output circuit, a capacitor connected between the said input and output circuits, a square wave producing circuit, means responsive to the said D.-C. amplifier output and controlling the time duration of the said square-waves produced by the said square-wave producing circuit, a D.-C. gating circuit controlled by the said square-wave producing circuit, a source of D.-C. reference current connected to the said D.-C. amplifier input circuit through the said D.C. gating circuit whereby the said D.-C. reference current is periodically applied to the said D.-C. amplifier input circuit, and a pulse forming network connected to the said square-wave producing circuit whereby the said sequential pulses are produced by the positive and negative going portions of the square wave produced by the said square-wave producing circuit.

These and other objects and advantages will become apparent from the following description when taken with the accompanying drawings. It will be understood that the drawings are for purposes of illustration and are not to be construed as defining the scope or limits of the invention reference being had for the latter purposes to the appended claims.

In the drawings wherein like reference characters denote like parts in the several views.

Figure 1:
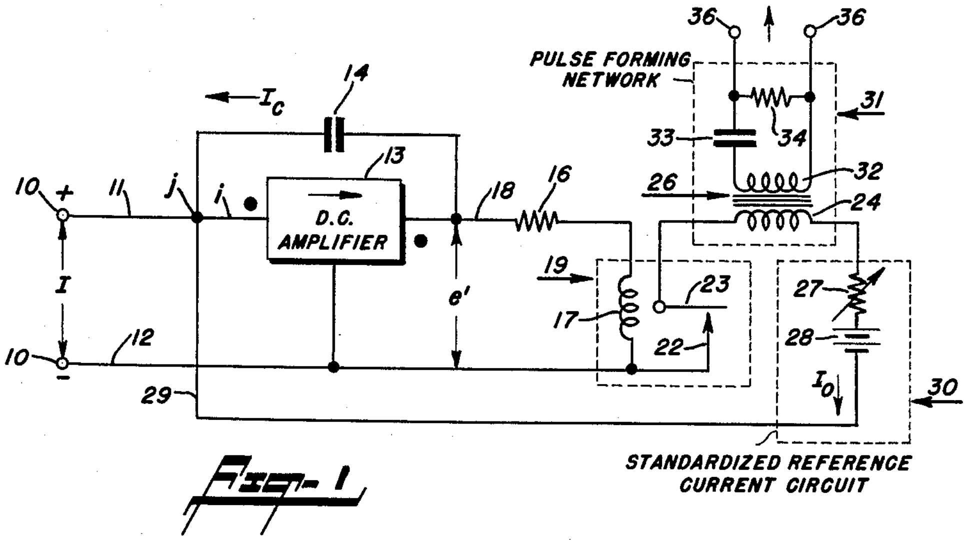
FIGURE 1 is a diagrammatic representation of one form of my novel pulse-time encoding apparatus adapted for use with an analog current input.
Figure 2:
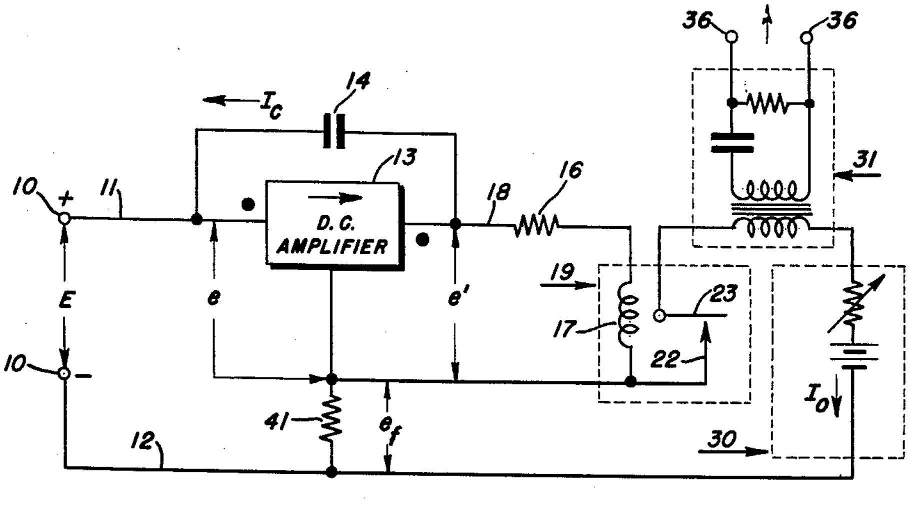
FIGURE 2 is a diagrammatic representation of a modified form of pulse-time encoder for use with a potential input.

Reference is now made to FIGURE 1 of the drawings wherein there is shown a diagrammatic presentation of an encoding apparatus which is adapted for use in translating a current input analog magnitude, designated I, into the pulse-time code. (With simple circuit modifications the encoding apparatus may be adapted to translate a potential input analog magnitude into the pulse-time code. The modification for potential input is shown in FIGURE 2 of the drawings and described below.) The input current I of FIGURE 1 is applied to a pair of input terminals 10 which are connected through lead wires 11 and 12 to a D.-C. amplifier 13; the lead wire 12 comprising a part of the common return connection of the encoding apparatus. The D.-C. amplifier 13 is provided with two feedback circuits; one being an A.-C. conductive circuit which includes a capacitor 14, connected directly between the D.-C. amplifier output and input circuits, and the other a D.-C. feedback circuit. The said D.-C. amplifier 13, together with the feedback capacitor 14, comprises an analog integrator, such integrator being known as a "Miller" integrator, as is well understood by those skilled in this art.

The D.-C. amplifier output circuit, includes a series connected resistor 16 and relay control winding 17 which are connected between the lead wire 18 and the common connection and lead wire 12. The relay, designated 19, is provided with a fixed contact 22 and a movable contact 23, which contacts are shown in a normal disengaged position. The relay contacts are connected in series with the D.-C. feedback circuit of the D.-C. amplifier. Opening and closing of the relay contacts control the application of a D.-C. feedback current designated $I_0$ to the input circuit of the D.-C. amplifier. The fixed relay contact 22 is connected to the common return wire 12, while the movable contact 23 is connected to the D.-C. amplifier input circuit through a series circuit which includes the primary winding 24 of a transformer 26, a variable resistor 27 and a source of D.-C. current 28, and a lead wire 29. The variable resistor 27 together with the source of D.-C. current 28 comprise a source of standardized reference current 30, the magnitude of which is adjustable to a predetermined value by the variable resistor 27. When the relay is closed, the reference current, which is designated $I_0$, is fed to the amplifier input circuit in an opposite sense to the input current thereby resulting in negative feedback. The transformer 26, the primary winding 24 of which is in the D.-C. feedback circuit, comprises a portion of a pulse forming network 31. The remainder of the pulse forming network includes the transformer secondary winding 32, a series connected capacitor 33, and a shunt resistor 34. The pulse forming network is provided with a pair of output terminals 36 which are connected to a standard telephone line for transmission of the pulses formed thereat.

In operation, analog input current I, is connected to the input terminals 10 and thus applied to a circuit junction, designated ($j$), as a point of current balance. The input current I is balanced continuously by the current through the capacitor 14, which current is designated $I_c$, and periodically by the reference current $I_0$ which is introduced into the junction when the relay 19 is energized. The balance equation at the junction ($j$) is thereby $$I+I_c+I_0\left(\frac{T_1}{T_1+T_2}\right)=0 \quad (2)$$

wherein $T_1$ is the time-period when the reference current $I_0$ is gated into the input junction, that is, when the relay 19 is closed, and $T_2$ is the time period when the reference current is zero, that is, when the relay 19 is open. The D.-C. amplifier 13 has a dimension of negative transfer resistance which essentially, and ideally, is infinite. Upon application of an input current I to the encoding apparatus, feedback will be satisfied by a current $I_c$ flowing through the capacitor 14 in response to a changing potential, designated $e'$, at the amplifier output circuit. The output potential $e'$ will build up until the relay 19 operates and the reference current $I_0$ is gated into the input circuit and applied to the junction ($j$). The net result is a sawtoothed oscillation of $e'$ illustrated by the uppermost waveform shown in FIGURE 3. The operating, or repetition, period $T_0$ (the sum of $T_1+T_2$) is a function of the capacitor 14 feedback current demand, the level of $e'$ required to operate the relay 19, and the value of the capacitor 14. It will be noted, however, that the repetition period $T_0$ is not a determinant of translation; the information being a ratio, i.e., the ratio $$\frac{T_1}{T_0}$$

The circuit junction ($j$) is thereby current balanced against the input current I by the reactive current $I_c$ through the capacitor 14 and the periodic application of the reference current $I_0$. The capacitor 14, however, cannot carry D.-C. components in continuing time, and so, the capacitor current $I_c$ need not be included in the balance Equation 2. Therefore, in time, the Equation 2 may be expressed as $$I+I_0\frac{T_1}{T_1+T_2}=0 \quad (3)$$

or $$I=-I_0\left(\frac{T_1}{T_1+T_2}\right) \quad (4)$$

From Equation 4 it will be apparent that the reference current $I_0$ must be greater than the full scale input current; and is preferably 4 to 10 times greater. If, for example, the analog input (I) has a 1 milliampere range, $I_0$ is normally 4 to 10 milliamperes.

While the reactive current $I_c$ cancels out of the balance equation in time, it does have a transient effect. The system is time delayed by the feedback current $I_c$ sufficiently to accommodate the time delay which is inherent in the circuitry and particularly the time delay of the relay. The amplifier and relay must be isolated from transient influences so that steady-state oscillation of the system will be undisturbed except by input changes.

Assuming that the capacitor 14 has infinite resistance the system error will entirely appear as an error current demand, designated $i$, required by the D.-C. amplifier.

Thus, the burden of performance is upon the D.-C. amplifier, with other variables and influences degenerated by the feedback mechanism.

It will be understood that any of the conventional type D.-C. amplifiers may be used for the D.-C. amplifier 13. A D.-C. amplifier of the type described in my United States Patent No. 2,744,168, entitled D.-C. Amplifier, and issued May 1, 1956, is particularly adapted for use in the novel pulse-time encoder of my invention. The established resolution of this amplifier is five (5) microvolts and 0.1 microampere with a relating match resistance of fifty (50) ohms. In the current-input case described above, the input range is one (1) milliampere, which gives a resolution ratio of 1 part in 10,000.

A modified circuit diagram of a pulse time encoder apparatus for potential input is shown in FIGURE 2 of the drawings. Referring to FIGURE 2, the circuit therein shown contains all of the circuit elements shown in FIGURE 1 with the addition of a feedback resistor 41 connected in common with the D.-C. amplifier 13 input and output circuits. In this case, a balancing potential is developed by the reference current $I_o$ flowing, repetitiously, through the feedback resistor 41 causing a feedback potential $e_f$. The input null circuit now includes series resistance which is normally 100 ohms. This is higher than the match resistance of the above-described D.-C. amplifier, and depreciates the theoretical resolution to about 1 part in 5,000. The input range of the potential-responsive system is 100 millivolts.

The gain parameter in this potential input case receives error potential ($e$) rather than current, and so has a dimension of transfer voltage ratio ($\mu$) rather than transfer resistance. Likewise, this ideally should be negative and infinite.

Figure 3:
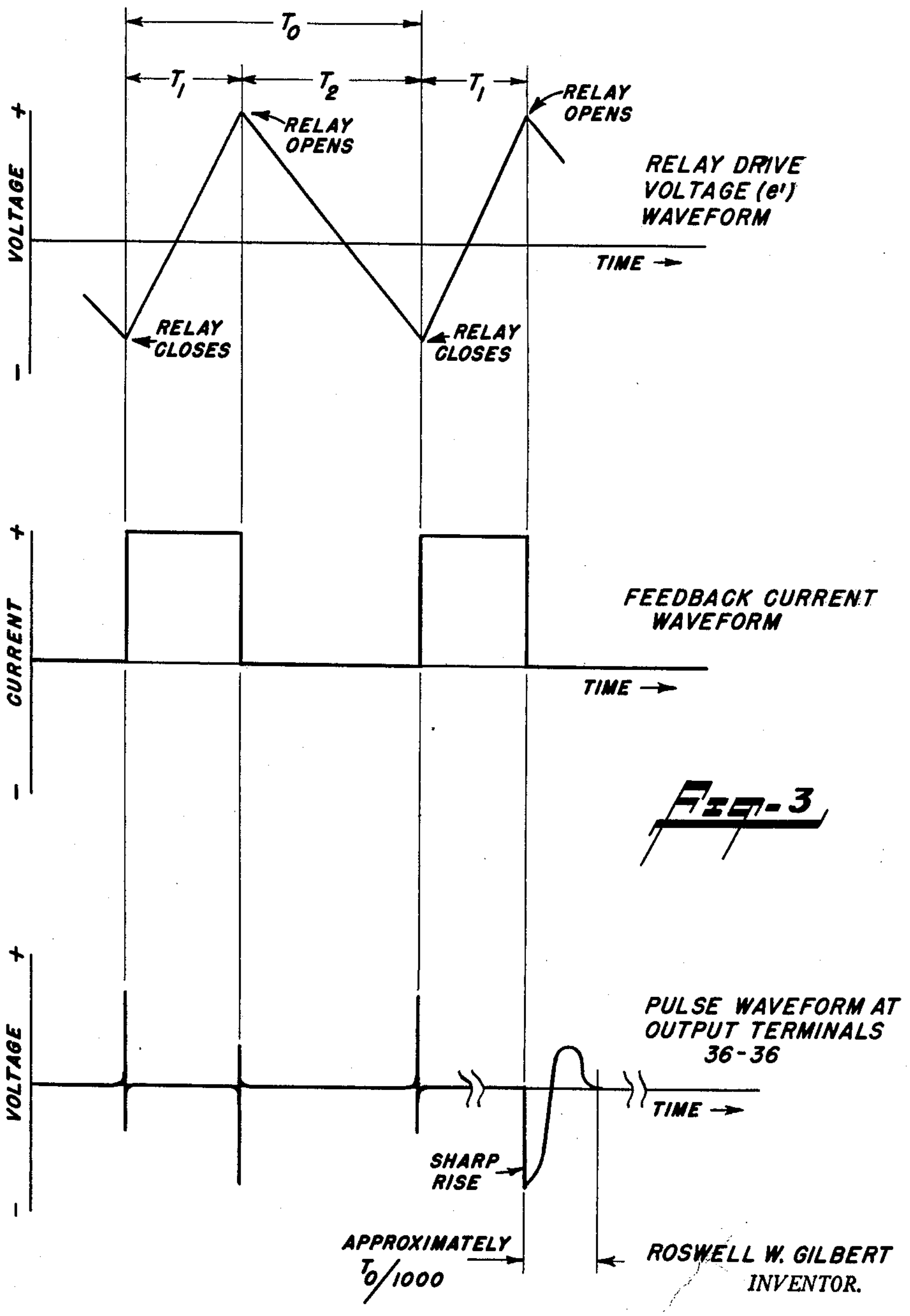
FIGURE 3 are curves illustrating various typical waveforms produced in the encoding apparatus of FIGURES 1 and 2.

Illustrations of the typical waveforms which are present at various points in the encoding apparatus of FIGURES 1 and 2 are shown in FIGURE 3. Assuming, for purposes of illustration, that the input current or potential is a constant value of the polarity illustrated in FIGURES 1 and 2, and the encoding apparatus has reached a steady-state condition, the amplifier output and relay drive potential will then be a saw-tooth oscillation as shown in the uppermost waveform illustrated in FIGURE 3, and described above. The relay closes when the voltage $e'$ reaches a predetermined negative level and remains closed until the level returns to zero. The time which the relay is closed is designated $T_1$ while the relay open time is designated $T_2$. The resulting feedback current waveform is a square-wave having a magnitude determined by the setting of the variable resistor 27 in the standardized reference current circuit 30 when the relay is closed, and which returns to zero when the relay is opened. The square-wave, or step-function, feedback current is then shaped by the pulse forming network 31, to produce pulses as illustrated in the lowermost waveform illustrated in FIGURE 3.

The pulse waveform at the output terminals 36, 36 is suited to the medium of transmission, which, in the encoding apparatus of my invention, is the standard telephone circuit. The desired pulse character for transmission over the standard telephone line may be described as follows:

($a$) The rise time should be sharp to fully utilize the line bandwidth; the line cut-off frequency will then determine the sharpness of the received pulse.

($b$) The integrated value of the pulse should be sufficient to carry over a line of minimum bandwidth as defined by the standard telephone circuit. This will insure against loss at the maximum acceptable level of line noise.

($c$) The pulse should restore the D.-C. level to zero. If a persistent tail of D.-C. is permitted, it may ride the noise peaks to a level approaching the signal crests.

The pulse forming network 31 comprises a critically damped L-C-R circuit wherein L is the mutual inductance of the transformer 26, C is the capacitance of the capacitor 33 and R is the resistance of the resistor 34. The step-function current from the relay 19 is coupled by the transformer 26 into the L-C-R circuit. A virtually instantaneous rise is developed across the resistance 34, and thereafter the circuit relapses through a reversal to restore the D.-C. zero. The potential across the resistor is applied to the telephone line through the terminals 36, 36. In FIGURE 3 of the drawings, one of the pulses is shown on an enlarged time scale whereby the pulse form is better seen. The L-C-R circuit is phase-resonant at about 1000 cycles per second, and the critical damping will terminate the pulse period at approximately 1 millisecond from the time of rise when an operating period ($T_o$) of the order of one (1) second is employed.

The process of receiving the information at the other end of the telephone circuit is essentially one of decoding the time-ratio pulses received over the communication channel back to an analog function. In this sense, it is the inverse of encoding. Any suitable decording system may be used; none having been shown in the drawings.

Figure 4:
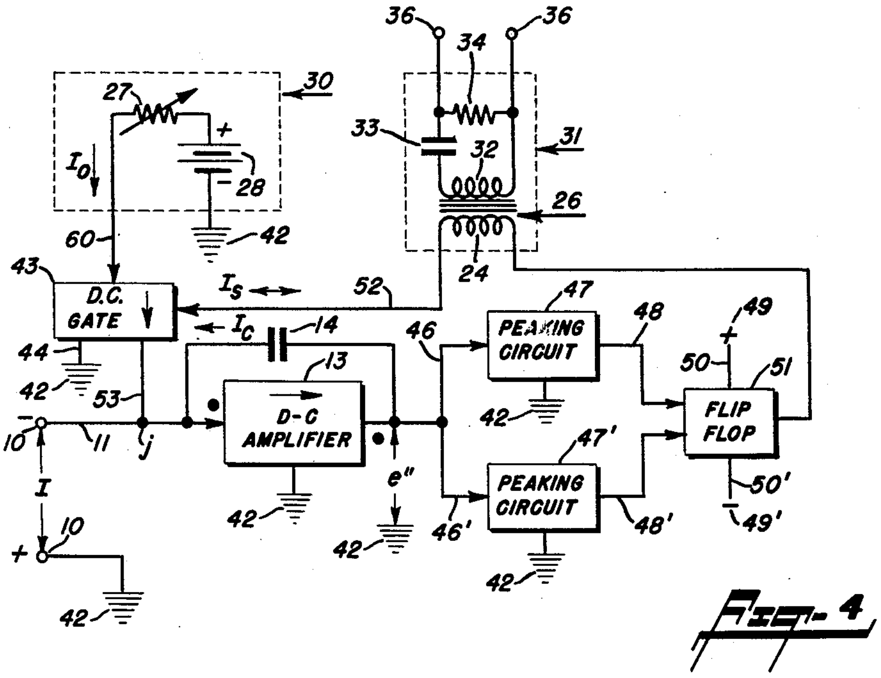
FIGURE 4 is a diagrammatic representation of a modified, all electronic, form of pulse time encoder.

The current and potential input encoding systems shown in FIGURES 1 and 2, respectively, involve the use of active mechanical elements, i.e., the mechanical relay 19, which relay is subject to wear. An improved modification of the encoding system which is entirely electronic, and which involves no contacts or other active mechanical elements, is shown in FIGURE 4 of the drawings. The all electronic system of encoding is particularly suited to continuous operation.

Figure 5:
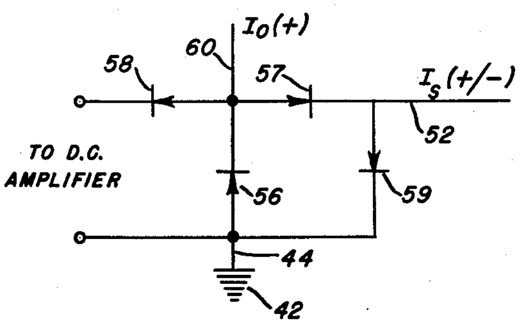
FIGURE 5 is a schematic circuit diagram of the D.-C. gate shown in block form in FIGURE 4.

Referring to FIGURE 4, the encoding apparatus therein shown includes the input terminals 10, 10 to which the analog input I is connected. One of the terminals 10 is connected through the lead wire 11 to the D.-C. amplifier 13 while the other terminal is connected directly to a common ground connection designated 42. As in the encoding apparatus shown in FIGURES 1 and 2, the D.-C. amplifier is provided with the feedback capacitor 14 which is connected between the amplifier output and input circuits, and which supplies the continuous feedback current $I_c$. Also, the standardized reference input circuit 30 comprising the series connected variable resistor 27 and source of potential 28, is included in the encoder circuitry of FIGURE 4. The standardized reference current $I_o$, however, is connected to the D.-C. amplifier input circuit through a D.-C. gating circuit 43. During time, $T_1$, the D.-C. gate is open and the reference current $I_o$ is fed to the D.-C. amplifier input circuit. During time $T_2$, the D.-C. gate is closed and the reference current $I_o$ is shunted to the common ground connection 42 through a lead wire 44. Details of the D.-C. gating circuit are shown in FIGURE 5 and described hereinbelow.

The output potential $e''$ from the D.-C. amplifier 13, which is a sawtooth waveform, is connected through lead wires 46 and 46' to peaking circuits 47 and 47', respectively. One of the peaking circuits is actuated by the positive-going portion of the sawtooth waveform $e''$ and produces a large magnitude trigger pulse of one polarity. The other peaking circuit is actuated by the negative-going portion of the sawtooth wave form $e'$ and produces a large magnitude trigger pulse of the other polarity. The alternate trigger pulses are connected through lead wires 48 and 48', respectively, to a "flip-flop," or Eccles-Jordan, circuit 51. The "flip-flop" circuit 51 is a "bistable" device which produces a square-waveform of alternate positive and negative polarity steps which are fed to the primary winding 24 of the transformer 26 in the pulse forming network 31 (the operation of the pulse forming network having been described above). The square wave output from the flip-flop circuit 31 is also connected through a lead 52 to the D.-C. gating circuit 43 and controls the opening and closing of the gate.

The peaking circuits 47 and 47' and the flip-flop circuit 51 may be of any conventional design. A conventional peaking circuit, for example, includes a high-mu triode tube which responds sharply when the grid swings into, or out of, the negative region. One of the peaking circuits is initiated by the arrival of the negative-going D.-C. amplifier output voltage ($e''$) at a consistent cut-off level. The cut-off level is, in part, determined by conductively applying the amplifier output ($e''$) to the high-mu triode tube of the one peaking circuit. When the grid of the peaking tube swings into the negative region, a sharp positive-going pulse appears at the plate of the triode tube. The pulse may be further sharpened by a Zener diode having a Zener potential of approximately 150 volts and coupling the plate of the triode to the grid of one of the tubes in the flip-flop circuit, for example. The Zener diode is normally blocked when the plate potential is low, and conducts when the rising plate potential reaches about 150 volts positive with respect to the grid. When the grid jumps positive, the flip-flop circuit is driven to the fall-over point reducing the diode voltage below the Zener potential and decoupling the flip-flop from the peaking circuit.

The other peaking circuit is initiated by the arrival of the positive-going D.-C. amplifier output ($e''$) at a consistent level. The D.-C. amplifier output ($e''$) is also conductively coupled to the high-mu triode tube of the other peaking circuit. When the grid of this peaking tube swings into the positive region, a sharp negative-going pulse appears at the plate of the triode tube. This pulse is also sharpened by conductively coupling the tubes through Zener diodes in the method described above, and connected to the flip-flop circuit 51. It will be understood that other modified peaking circuits may be used in my novel encoding apparatus.

The rise and fall of the sawtooth potential ($e''$) is relatively slow. The initiation of a trigger pulse by one peaking circuit 47 is determined at a first potential which is consistently similar upon successive cycles of operation, while the initiation of a trigger pulse by the other peaking circuit 47' is determined at a second potential which is, likewise, consistently similar upon successive cycles of operation. For this reason, the peaking circuits must be conductively coupled to the flip-flop circuit as described above. The Zener diodes serve this purpose; and further, they decouple the peaking circuits from the flip-flop circuit during the greater portion of the cycle leaving the flip-flop free to respond to the next trigger pulse.

The flip-flop circuit 51, is a bistable multivibrator having two stable limiting conditions into which the circuit is alternately triggered by the trigger pulses from the peaking circuits 47 and 47'. One simple, conventional, form of flip-flop circuit comprises two triode tubes in which the grid of the first tube is coupled to the anode of the second tube through a network consisting of a parallel connected resistor and capacitor, and the grid of the second tube is similarly coupled to the anode of the first tube through an identical coupling network. This basic circuit is bistable; one condition exists when the first tube is conducting and the second is cut-off, and another condition exists when the second tube is conducting and the first is cut-off. The circuit remains in one or the other of these two conditions with no change in plate, grid, or cathode potentials, or plate current, until triggered by a trigger pulse from one of the peaking circuits. The tubes then reverse their functions and remain in the new condition as long as plate current flows in the conducting tube. The output from the flip-flop circuit is thereby a step function having a square waveform which is alternately positive and negative. (As seen in FIGURE 4, the flip-flop 51 is connected to a source of positive and negative voltage 49 and 49' through lead wires 50 and 50', respectively, whereby the square wave may assume alternate positive and negative polarities, as will be understood by those skilled in this art.) Other well known flip-flop circuits utilize saturable reactors or transistors and may be used in my novel encoding apparatus.

The D.-C. gating circuit 43 may also be of a conventional design. However, a novel D.-C. gating circuit employing high-performance diode types is particularly adapted for use in the encoding appaartus of my invention. Reference is now made to FIGURE 5 of the drawings wherein a schematic diagram of the novel D.-C. gating circuit is shown. The gating circuit is simple and comprises four rectifier elements 56, 57, 58 and 59, which are arranged to switch the positive reference current $I_o$ into, and away from, the D.-C. amplifier 13, by means of a control switching current designated $I_s$. The control switching current is obtained from the flip-flop 51 through the lead wire 52, as shown in FIGURE 4, and described above. The positive reference current $I_o$ is connected through a lead 60 to a junction between the three rectifier elements 56, 57 and 58, and the switching current lead is connected to the junction between the rectifier elements 57 and 59. The reference current $I_o$ is gated open into the D.C. amplifier when the switching current $I_s$ is positive (+) and is gated away from the D.-C. amplifier, or closed, when the switching current is negative. (The diodes may be reversed for reversed polarity reference and switching currents.) The switching current $I_s$ must be at least larger than the switched, or reference, current $I_o$, and preferably about 10 times as large, in both gate-open and gate-closed directions.

In the operation of the gating circuit in the encoding system, a positive reference current $I_o$ having a level of 5 milliamperes is normal. The gate is opened by a switching current $I_s$ that is positive and greater than zero, for example, 1 milliampere. Under these conditions the rectifier elements 56 and 57 are blocked and the elements 58 and 59 conducting. All of the reference current then flows through the load and the rectifier element 58, while all of the switching current $I_s$ flows through the rectifier element 59. The gate is closed by a negative switching current $I_s$ that is at least greater than the 5 milliampere level of the reference current, for example, 7 milliamperes. Under these conditions the rectifier elements 56 and 57 are conducting and the rectifier elements 58 and 59 are blocked. With the rectifier element 58 blocked, none of the reference current flows to the D.-C. amplifier input.

With a D.-C. gate of the type described, the load is limited in potential burden to a level where the rectifier ele- 57 will block due to the forward drop through the rectifier element 59 less the load burden potential. The load in the encoder apparatus is the D.-C. amplifier 13 which possesses a suitably low impedance input. The gating circuit responds to a switching current which is variable within relatively wide limits. The performance of the gating circuit depends upon the high reverse resistance characteristic of diffused-junction silicon diodes which are used for the rectifier elements 56, 57, 58 and 59. The integrity of the reference current and gate leakage is better than 1 part in 10,000 and in effect the gate functions as a relay having a speed of a few microseconds.

Figure 6:
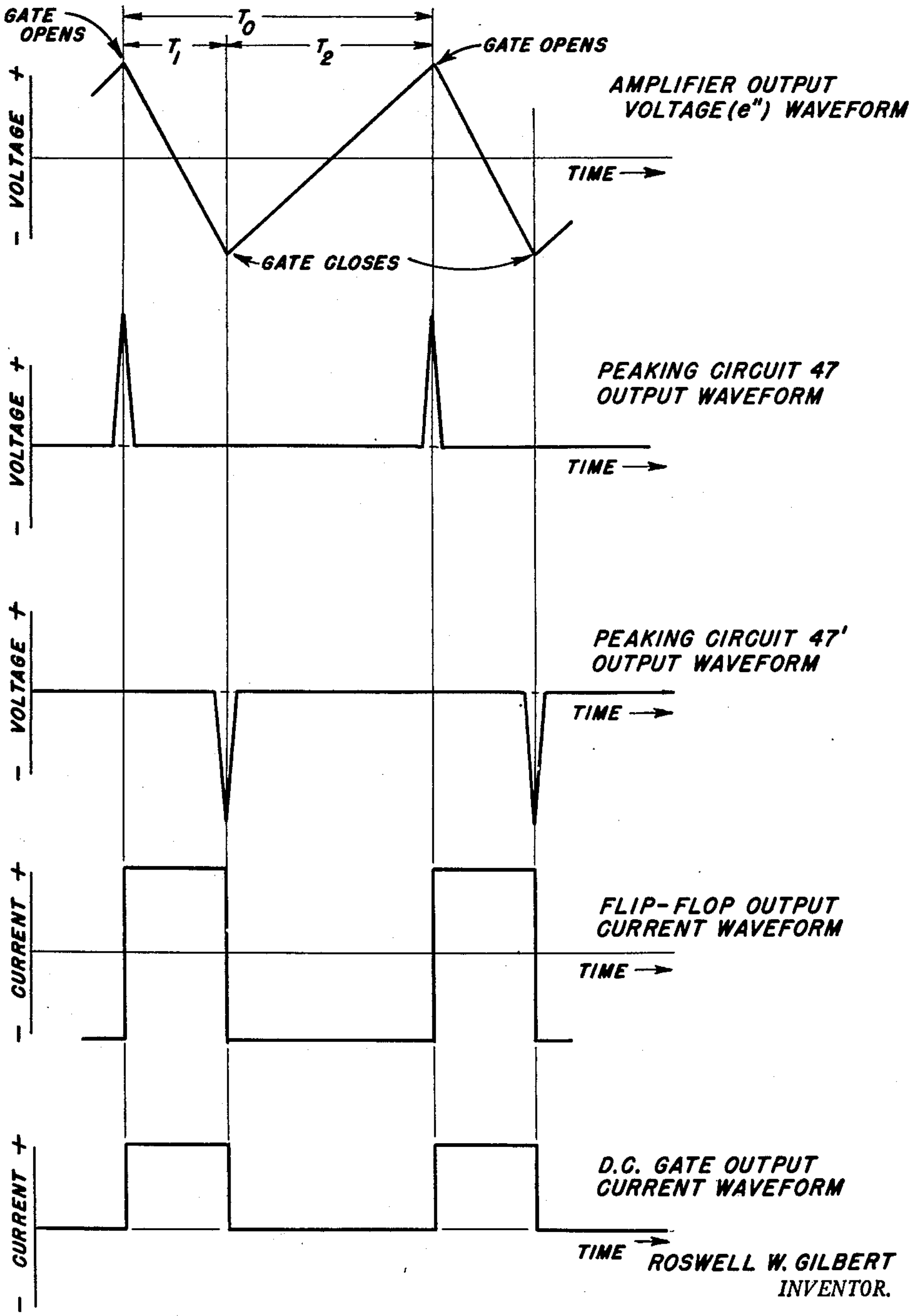
FIGURE 6 are curves illustrating various typical waveforms produced in the encoding apparatus of FIGURE 4.

The operation of the all electronic encoding apparatus of FIGURE 4 is similar to the operation of the apparatus utilizing a relay shown in FIGURE 1 and described above. While the operation of the apparatus of FIGURE 4 is apparent from the above description, a brief explanation follows. Reference is made to FIGURE 6 of the drawings wherein typical waveforms which appear at various locations in the appaartus are shown. With a constant level negative input signal I, the amplifier output voltage ($e''$) waveform is a sawtooth shape of the same character as the relay drive voltage ($e'$) shown in FIGURE 3. During the time $T_1$ the D.-C. gating circuit is open and the reference current $I_o$ connected to the input circuit of the D.-C. amplifier 13, and during the time $T_2$ the gate is closed and the reference current $I_o$ shunted to the common ground connection 42 through the lead wire 44. One peaking circuit 47 functions to produce a trigger pulse as shown in FIGURE 6 when the amplifier output voltage $e''$ reaches a consistent, predetermined, level on the positive-going portion of the triangular-shaped waveform $e''$. This trigger pulse is fed through lead 48 to the bistable, flip-flop circuit 51 causing the flip-flop circuit to assume one of the two stable operating conditions. The flip-flop output current, as seen in FIGURE 6, is then positive. The positive flip-flop output current is fed through the primary winding 24 in the pulse forming circuit 31 to the D.-C. gating circuit 43. (With a positive-going step current in the winding 24, the pulse forming circuit forms a sharp pulse as described above and shown in FIGURE 3.) The flip-flop output current as seen in FIGURE 6 is of a sufficient magnitude to open the D.-C. gate 43. When the D.-C. gate is open, the positive D.-C. gate output current (that is, the reference current $I_0$) is fed through the gating circuit to the amplifier input circuit. The reference current $I_0$ is of a greater magnitude than the input current I, and of opposite polarity thereto, and so drives the D.-C. amplifier such that the amplifier output voltage ($e''$) goes in a negative direction. When the negative-going voltage $e''$ reaches a second consistent, predetermined, level the other peaking circuit 47′ functions to produce a trigger pulse as seen in FIGURE 6. This trigger pulse is fed through the lead wire 48′ to the flip-flop 51 causing the flip-flop circuit to assume the second stable operating condition. The flip-flop output current, as seen in FIGURE 6, then goes negative. The negative-going step causes a pulse of opposite polarity at the output terminals of the pulse forming network as described above and shown in FIGURE 3. The negative flip-flop current is of sufficient magnitude to close the D.-C. gating circuit thereby stopping the flow of reference current $I_0$ to the amplifier input. The entire cycle then repeats in the above-described manner. As in the systems shown in FIGURES 1 and 2, the operating period $T_0$ is not fixed value; the pulse-time code being the ratio $T_1/T_0$.

Having now described my invention in detail, in accordance with the patent statutes, various other changes and modifications will suggest themselves to those skilled in this art. For example, in the circuits employing a relay, the relay could be of the double throw type having a pair of fixed contacts, and the reference current $I_0$ fed back to the input of the D.-C. amplifier 13 in an alternate negative and positive feedback sense. The coding standard would, of course, be changed; the information being the ratio

$$\frac{T_1-T_2}{T_0}$$

Again no absolute time is used, as this method is also based upon a time ratio. It is intended that this, and various other changes and modifications, shall fall within the spirit and scope of the invention as recited in the following claims.

I claim:

1. An encoding apparatus for pulse-time encoding an analog input, the said apparatus comprising an analog time integrator having an input and output circuit, the said analog input being connected to the said input circuit; an analog reference source; an analog gate connected between the said reference source and the input circuit of the said time integrator, the said time integrator being responsive to the algebraic sum of the said analog input and gated reference, the time integral from the said time integrator output circuit being connected to the said gate whereby the said gate is opened solely in response to a first predetermined level of time integral and closed solely in response to a second predetermined level of time integral; and pulse forming means connected to the gate for forming pulses when the gate closes and opens, the time spacing of the pulses being related to the average value of the analog input over an operating cycle.

2. A pulse-time encoding system for encoding an electrical analog input into a pulse-time ratio, comprising: an analog input circuit, an analog reference source, an analog gate connected between said reference source and said input circuit, an analog time integrator circuit responsive to the algebraic sum of the input and the gated reference, peaking circuit means solely responsive to the time integral from said integrator and connected to said gate whereby said gate is opened in response to a first predetermined level of time integral and is closed in response to a second predetermined level of time integral, and pulse forming circuit means connected to the gate and responsive to the operations of the said gate for forming pulses of opposite polarity when the gate opens and closes, respectively, the time spacing of the pulses being related to the average value of analog input over an operating cycle.

3. A pulse-time encoder for pulse-time encoding an analog input, comprising a D.-C. amplifier having an input and output circuit, the said analog input being connected to the said D.-C. amplifier input circuit; a capacitor connected between the said D.-C. amplifier output and input circuits; D.-C. gating means responsive only to the amplitude level of the amplifier output, the output of the said D.-C. amplifier being connected thereto for control thereof, the said D.-C. gating means being gated open at a first predetermined and consistent level of amplifier output and gated closed at a second predetermined and consistent level thereof; a source of D.-C. reference current connected to the said input circuit of the D.-C. amplifier through the said gating means and controlled thereby; and a pulse-forming network connected to the D.-C. gating means and responsive to operations of the D.-C. gating means whereby a pulse of one polarity is produced thereat when the said D.-C. gate is opened, and a pulse of the opposite polarity is produced when the the said D.-C. gate is closed.

4. An encoding apparatus for pulse-time encoding an analog input, the said apparatus comprising a D.-C. amplifier having an input and output circuit, the said analog input being connected to the said input circuit; a capacitor connected between the said D.-C. amplifier output and input circuits; a square-wave producing circuit; means responsive solely to the said D.-C. amplifier output controlling the time duration of the said square-waves, the leading edge of the said square-waves being produced at a time at which a first predetermined level of D.-C. amplifier output is reached and the trailing edge of the said square waves being produced at a time at which a second predetermined level of D.-C. amplifier output is reached; a D.-C. gating circuit controlled by the said square-waves; and a source of D.-C. reference current connected to the said D.-C. amplifier input circuit through the said D.-C. gating circuit and controlled thereby.

5. The invention as recited in claim 4, wherein the said square-wave producing circuit comprises a bistable flip-flop responsive to first and second predetermined levels of D.-C. amplifier output.

6. The invention as recited in claim 5, including first and second peaking circuits for producing first and second trigger pulses at the said first and second predetermined levels, respectively, of D.-C. amplifier output, the said trigger pulses being connected to the said bistable flip-flop circuit for control thereof.

7. An encoding apparatus for pulse-time encoding an analog input, the said apparatus comprising an analog integrator having an input and output circuit, the said analog input being conductively connected to the said input circuit; an analog reference source; an analog gate connected between the said reference source and the input circuit of the analog integrator, the said analog integrator being solely responsive to the algebraic sum of the said analog input and gated reference, the said integrator integrating in one direction during the entire time the said gate is closed and in the other direction during the entire time the gate is open; means responsive solely to the integrator output for alternately opening and closing the said gate; and pulse forming means connected to the gate for forming pulses when the gate opens and when the gate closes, the time spacing of the pulses being related to the average value of the input signal over an operating cycle.

8. An encoding apparatus for pulse-time encoding an analog input, the said apparatus comprising an analog integrator having an input and output circuit, the said analog input being conductively connected to the said input circuit; an analog reference source; an analog gate connected between the said reference source and the input circuit of the analog integrator, the said analog integrator being solely responsive to the algebraic sum of the said analog input and gated reference; means alternately opening and closing the said gate, the last-mentioned means including means solely responsive to the integrator output circuit for closing the said gate in response to a predetermined level of integrator output, the said integrator integrating in one direction the entire time the gate is open and integrating in the other direction the entire time the gate is closed; and pulse forming means connected to the gate for forming pulses of opposite polarity when the gate closes and opens, respectively, the time spacing of the pulses being related to the average value of the input signal over the operating period.

9. A pulse-time encoder for encoding an electrical analog input into a pulse-time ratio, comprising an analog integrator having an input and output circuit, the said analog input being conductively connected to the said integrator input circuit; an analog gate; a source of analog reference current connected to the said integrator input circuit through the said analog gate; means connecting the output circuit of the said integrator to the said gate for control of the gate, the said gate being closed solely in response to a predetermined level of integrator output; and pulse forming means connected to the gate and forming pulses of one polarity when the gate closes and of another polarity when the gate opens, the time spacing of the pulses being indicative of the average value of the input signal over an operating cycle.

10. A pulse-time encoder for pulse-time encoding an analog input, comprising a D.-C. amplifier having an input and output circuit, the said analog input being connected to the said D.-C. amplifier input circuit; a capacitor connected between the said D.-C. amplifier output and input circuits; a D.-C. gate; first and second peaking circuits coupled to the said D.-C. amplifier output circuit, the said first peaking circuit producing first trigger pulses at a first predetermined and consistent level of amplifier output, the said second peaking circuit producing second trigger pulses at a second predetermined and consistent level of amplifier output; a D.-C. gate control bistable flip-flop having two inputs and an output; means connecting the said first and second trigger pulses from the said peaking circuits to the said D.-C. gate control bistable flip-flop inputs; means connecting the said D.-C. gate control bistable flip-flop output to the said D.-C. gate for control thereof; and a source of D.-C. reference current connected to the said input circuit of the D.-C. amplifier through the said gating means and controlled thereby.

11. The invention as recited in claim 10 wherein the said means connecting the said D.-C. gate control bistable flip-flop output to the said D.-C. gate includes a pulse-forming network whereby a pulse of one polarity is produced when the said D.-C. gate control bistable flip-flop output is positive-going and a pulse of the opposite polarity is produced when the said D-C. gate control bistable flip-flop output is negative-going.

References Cited in the file of this patent

UNITED STATES PATENTS

| | | |
|---|---|---|
| 2,657,318 | Rack | Oct. 22, 1953 |
| 2,717,994 | Dickinson | Sept. 13, 1955 |
| 2,730,632 | Curtis | Jan. 10, 1956 |
| 2,754,503 | Forbes | July 10, 1956 |
| 2,791,769 | Gray | May 7, 1957 |
| 2,845,597 | Perkins | July 29, 1958 |
| 2,849,181 | Lehmann | Aug. 26 1958 |
| 2,891,725 | Blumenthal et al. | June 23, 1959 |